(12) United States Patent
Brandenburger

(10) Patent No.: US 6,382,637 B1
(45) Date of Patent: May 7, 2002

(54) DEVICE FOR CONTROLLING THE FLOW RATE OF HYDRAULIC FLUID IN A SUPPLY LINE FOR VEHICLES

(75) Inventor: Walter Brandenburger, Neuss (DE)

(73) Assignee: Firma Carl Freudenberg, Weinheim (DE)

(*) Notice: Subject to any disclaimer, the term of this patent is extended or adjusted under 35 U.S.C. 154(b) by 0 days.

(21) Appl. No.: 09/920,585

(22) Filed: Aug. 1, 2001

(30) Foreign Application Priority Data

Aug. 12, 2000 (DE) .......................................... 10052888

(51) Int. Cl.$^7$ ............................................. B60G 17/01
(52) U.S. Cl. ............................. 280/5.503; 280/124.16
(58) Field of Search ............................. 280/5.5, 5.501, 280/5.503, 5.512, 5.514, 5.515, 124.159, 124.16, 124.161; 180/41; 267/64.16

(56) References Cited

U.S. PATENT DOCUMENTS

| | | | | |
|---|---|---|---|---|
| 3,233,909 A | * | 2/1966 | Boone | 280/6 |
| 3,703,298 A | * | 11/1972 | Laverda | 280/6 H |
| 3,938,823 A | * | 2/1976 | Hiruma | 280/124 F |
| 4,050,704 A | * | 9/1977 | Duca et al. | 280/6 R |
| 4,903,209 A | * | 2/1990 | Kaneko | 364/424.05 |
| 4,971,353 A | * | 11/1990 | Buma et al. | 280/707 |
| 5,043,893 A | * | 8/1991 | Aburaya et al. | 364/424.05 |
| 5,141,245 A | * | 8/1992 | Kamimura et al. | 280/707 |
| 6,061,615 A | * | 5/2000 | Karhauser | 701/37 |

FOREIGN PATENT DOCUMENTS

| | | |
|---|---|---|
| DE | 42 42 448 | 3/1994 |
| DE | 197 19 075 | 11/1998 |

* cited by examiner

Primary Examiner—Christopher P. Schwartz
Assistant Examiner—Benjamin A Pezzlo
(74) Attorney, Agent, or Firm—Kenyon & Kenyon

(57) ABSTRACT

A device for controlling the flow rate of hydraulic fluid in a supply line for the cylinder chambers of suspension cylinders in vehicles, especially tractors, having a permanent suspension axle, whose height is regulated by a level control device, a choke being inserted into the supply line for limiting the flow rate of the hydraulic fluid, the supply line (2) being furnished with a bypass line (15) circumventing the choke (4), an auxiliary choke (16), controlled by a control unit (17) having level sensors, being inserted into the bypass line, the auxiliary choke being switched on in response to pronounced static load change when the limit stops of the vehicle axle are reached, permitting a larger flow rate of the hydraulic fluid.

4 Claims, 1 Drawing Sheet

DEVICE FOR CONTROLLING THE FLOW RATE OF HYDRAULIC FLUID IN A SUPPLY LINE FOR VEHICLES

BACKGROUND OF THE INVENTION

1. Field of the Invention

The invention relates to a device for controlling the flow rate of hydraulic fluid in a supply line to the cylinder chambers of suspension cylinders in vehicles, especially tractors, having a permanent suspension axle, whose height is regulated by a level control device, a choke being inserted into the supply line for limiting the flow rate of the hydraulic fluid.

2. Description of Related Art

From German Patent 42 42 448, a hydropneumatic suspension device is known for vehicles having high load-bearing requirements and having a load-sensing pump as a pressure supply, in which static load changes are compensated for by increasing and decreasing control processes. The dynamic position change is measured by electrical sensors and is conveyed to the level control device as an averaged signal. To adjust the control speed, a choke, through which fluid can flow in both directions, is inserted into the supply line leading to the suspension cylinder circuit. However, this choke is an obstacle for rapid pressure adjustment in response to large load changes.

An improvement is achieved by the device described in German Patent 197 19 075 A1, which, in the decreasing control mode, makes possible an essentially identical volume flow, thus, at the same time, making possible the decreasing control processes, irrespective of the varying static pressure level. This solution makes it possible to use a larger control nozzle, which permits higher control quantities at lower axle loads, thus shortening the adjusting times. When the vehicle axle reaches the limit stops in particularly high load changes, this measure is not sufficient.

SUMMARY OF THE INVENTION

It is an object of the invention to create a suspension concept that, in response to load changes, keeps the adjustment times short, up to point of reaching the limit stops. It is a further object of the invention to provide such a suspension design that is comfortable and soft overall.

These and other objects of the invention are achieved in a device for controlling the flow rate of hydraulic fluid in a supply line to the cylinder chambers of suspension cylinders in vehicles, especially tractors, having a permanent suspension axle, whose height is regulated by a level control device, a choke being inserted into the supply line for limiting the flow rate of the hydraulic fluid. According to the invention, the supply line is provided with a bypass line that circumvents the choke, an auxiliary choke, controlled by a control unit via level sensors, being inserted into the bypass line, the auxiliary choke being switched on in response to pronounced static load change when the limit stops of the vehicle axle have been reached, thus permitting a larger flow rate of the hydraulic fluid. As a result of this measure, adjusting times in the accumulator are shortened. Using the bypass line, the pressure adjustment is carried out in a rapid and short-term manner. As soon as the pressure adjustment is completed and the vehicle axle has moved slightly from its limit stops, the auxiliary choke is closed once again and the further control process can be carried out, for example in the manner indicated in German Patent 197 19 075. The level control device can be set so that it disconnects the auxiliary choke as soon as the vehicle axle has moved from its limit stop by at least two millimeters. In this manner, the accumulators can be filled up or emptied to the required load pressure more rapidly.

BRIEF DESCRIPTION OF THE DRAWINGS

The present invention will be described in greater detail with reference to the following drawings wherein.

DETAILED DESCRIPTION OF THE INVENTION

Figure 1:
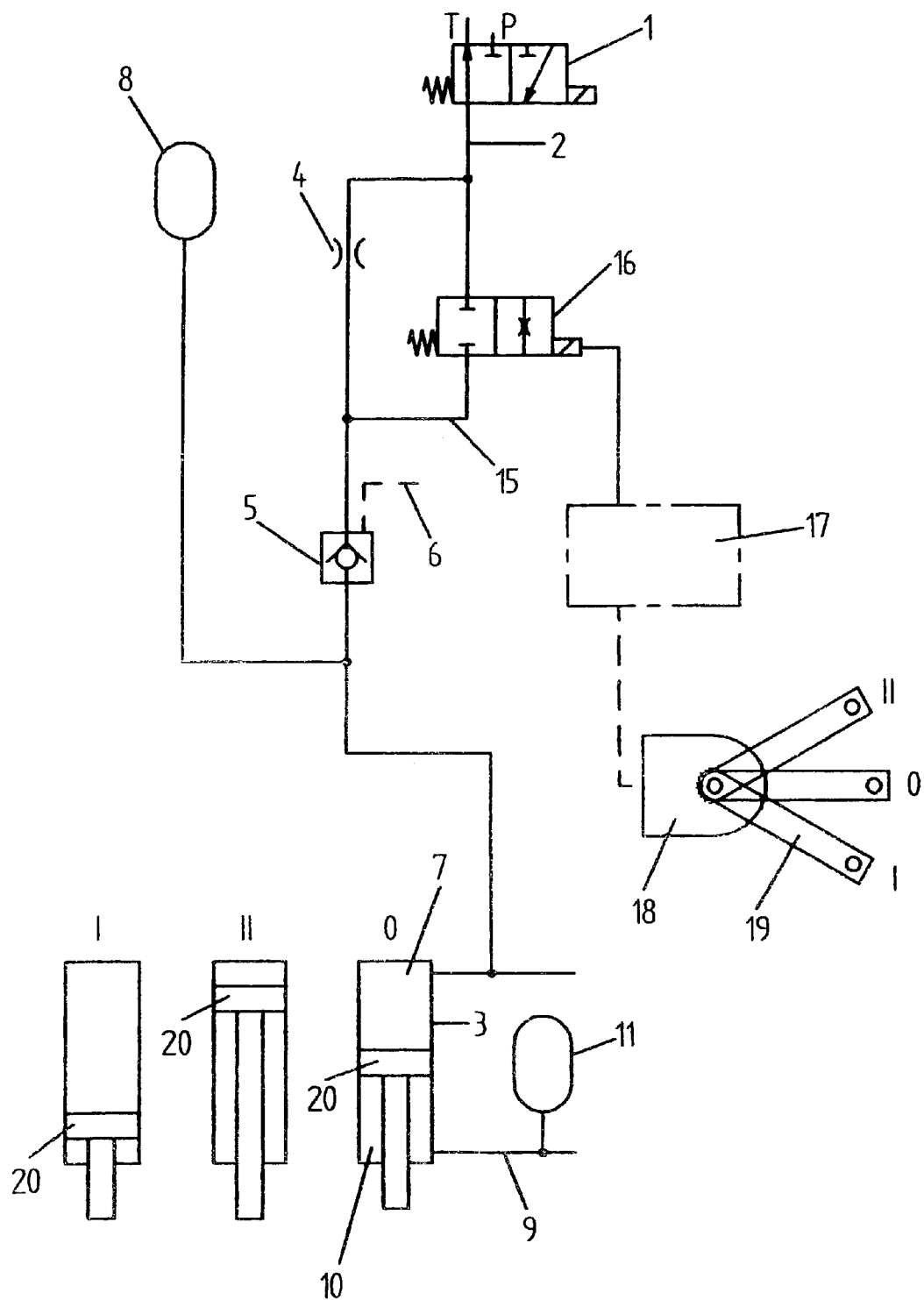
FIG. 1 is a simplified circuit diagram which depicts a device which can be inserted into a conventional circuit for overall control.

FIG. 1 illustrates a simplified circuit diagram, which contains all of the parts relating to the new device. Furthermore, this device can be inserted into a conventional circuit diagram for overall control. Valve 1, which is driven for the increasing control function, is inserted between a pump, which is not depicted in greater detail, and hydraulic supply line 2, which leads to suspension cylinder 3. Located in supply line 2, in a familiar manner, is fixed choke 4, which limits the flow rate in both directions. Also located in supply line 2 is openable check valve 5, to which control line 6 is connected. Supply line 2 leads finally to cylinder chamber 7 of suspension cylinder 3 and at the same time also to the cylinder chamber of a second suspension cylinder, which is not depicted in greater detail. Also connected to supply line 2 is pressure accumulator 8, which has the function of a suspension component. Via a further supply line 9, ring chambers 10 of suspension cylinder 3 are connected to each other. Here pressure accumulator 11 is connected as a suspension component. Control line 6 leads to openable check valve 5, it being necessary, in the decreasing control function, for the control line to be acted upon by pressurized oil. The pressure in ring chamber 10 is generally kept constant by a separate control device.

In the area of choke 4, supply line 2 is provided with a bypass line 15, into which auxiliary choke 16 is inserted. Auxiliary choke 16 is controlled by a control unit 17 as a function of the vehicle axle position. Reference numeral 18 designates symbolically an electrical level sensor, to whose lever 19 vehicle axle is connected via a lever system. Reference numerals 0 as well as I and II indicate the center position and the end positions of the vehicle axle. On the left side of the Figure, the corresponding position of piston 20 is indicated. In the 0 position, the axle is in its standard level, and piston 20 is in the center of suspension cylinder 3. In the drawing, auxiliary choke 16 is in the closed position. When check valve 5 is closed, the vehicle axle is suspended by suspension cylinder 3 in conjunction with pressure accumulators 8 and 11. As soon as the static load changes such that the limit stops of the vehicle axles are reached, so that positions I or II are reached, this is transmitted to level regulator 18 via lever 19 and is communicated to control unit 17 as a signal.

When the axle load is sharply reduced, in particular when heavy rear trailer devices are lifted, the axle is pressed into the rebound limit stops by the excess pressure of accumulator 8 and lever 19 adopts position I. In response to the subsequent decreasing control function, pressure line 6 is supplied with pressure via the undepicted control block, so that pressurized oil can flow from accumulator 8 via opened check valve 5. In position I on lever 19, control unit 17 is activated by the signal of level sensor 18 so as to open choke 16, so that pressurized oil can escape from the cylinder suspension circuit more rapidly so as to be able to change the axle position as rapidly as possible.

When the axle load increases sharply, the axle lies on the suspension limit stops due to insufficient pressurized oil, and lever 19 adopts position II, so that, activated by level sensor 18, control unit 17 opens choke 16, and, in the increasing control process, by opening valve 1 and releasing check valve 5, accumulator 8 is filled rapidly to the necessary pressure level in order to be able to move the axle from the limit stops without a long delay.

After a short lifting motion from the limit stops, choke 16 is switched off once again so that the axle is reset at the setpoint level at the regulating speed determined by choke 4.

What is claimed is:

1. A device for controlling the flow rate of hydraulic fluid in a supply line for a cylinder chamber of a suspension cylinder in a vehicle having a permanent suspension axle, whose height is regulated by a level control device, comprising: a choke inserted into the supply line (2) for limiting the flow rate of the hydraulic fluid, the supply line (2) being furnished with a bypass line (15) circumventing the choke (4); and an auxiliary choke (16), controlled by a control unit (17) having level sensors, inserted into the bypass line, the auxiliary choke being switched on in response to pronounced static load change when the limit stops of the vehicle axle are reached, permitting a higher flow rate of the hydraulic fluid.

2. The control device according to claim 1, wherein the auxiliary choke (16) is switched off once again after the vehicle axle has moved from its limit stops by at least 2 mm.

3. A vehicle which incorporates the control device according to claim 1.

4. A tractor which incorporates the control device according to claim 1.

* * * * *